(12) United States Patent
Kim (10) Patent No.: US 9,304,817 B2
(45) Date of Patent: Apr. 5, 2016

(54) METHOD AND APPARATUS FOR A USER-DRIVEN PRIORITY BASED JOB SCHEDULING IN A DATA PROCESSING PLATFORM

(71) Applicant: Xerox Corporation, Norwalk, CT (US)

(72) Inventor: Hyun Joo Kim, Monmouth Junction, NJ (US)

(73) Assignee: Xerox Corporation, Norwalk, CT (US)

(*) Notice: Subject to any disclaimer, the term of this patent is extended or adjusted under 35 U.S.C. 154(b) by 211 days.

(21) Appl. No.: 14/089,253

(22) Filed: Nov. 25, 2013

(65) Prior Publication Data

US 2015/0150016 A1 May 28, 2015

(51) Int. Cl.
*G06F 9/46* (2006.01)
*G06F 9/48* (2006.01)
*G06F 9/50* (2006.01)

(52) U.S. Cl.
CPC ............ *G06F 9/4881* (2013.01); *G06F 9/5038* (2013.01); *G06F 2209/483* (2013.01); *G06F 2209/5014* (2013.01); *G06F 2209/5021* (2013.01)

(58) Field of Classification Search
CPC .................................................... G06F 9/4881
See application file for complete search history.

(56) References Cited

U.S. PATENT DOCUMENTS

| 2011/0173626 A1* | 7/2011 | Chi et al. ........................ 718/103 |
| 2012/0131591 A1* | 5/2012 | Moorthi et al. ................ 718/104 |
| 2012/0159336 A1* | 6/2012 | Norwood ....................... 715/733 |
| 2012/0198462 A1* | 8/2012 | Cham et al. .................... 718/103 |

OTHER PUBLICATIONS

Sandholm et al., "Dynamic Proportional Share Scheduling in Hadoop," in *Proceedings of the 15th Workshop on Job Scheduling Strategies for Parallel Processing*, Springer, 2010, consists of 20 unnumbered pages.
Hadoop's Capacity Scheduler, http://hadoop.apache.org/.

(Continued)

*Primary Examiner* — Gregory A Kessler
*Assistant Examiner* — Steven Do (57) ABSTRACT

A method, non-transitory computer readable medium, and apparatus for configuring a scheduling a job request in a data processing platform are disclosed. The method receives a new job request having a priority selected by a user, submits the new job request to an online job queue comprising a plurality of jobs, wherein each one of the plurality of jobs comprises a respective priority selected by a respective user and schedules the new job request and the plurality of jobs in the online job queue to one or more available worker nodes in a unit time slot based upon a comparison of the priority of the new job and the respective priority of the plurality of jobs in the online job queue, wherein the scheduling algorithm is based on one of: blocks having a variable size and a static processing time or blocks having a static size and a variable processing time.

17 Claims, 6 Drawing Sheets

(56) References Cited

OTHER PUBLICATIONS

Zaharia M., et al., "Improving MapReduce Performance in Heterogeneous Environments," *in the 8th USENIX Symposium on Operating Systems Design and Implementation* (*OSDI*), 2008, consists of 14 unnumbered pages.

Zaharia M., et al., "Delay Scheduling: A Simple Technique for Achieving Locality and Fairness in Clustering Scheduling," *in Proceeding of the European Conference on Computer Systems* (*Eurosys*), 2010, consists of 14 unnumbered pages.

Kc, K., et al., "Scheduling Hadoop Jobs to Meet Deadlines," *IEEE 2nd International Conference on Cloud Computing Technology and Science* (*CloudCom*), 2010, consists of 5 unnumbered pages.

\* cited by examiner

METHOD AND APPARATUS FOR A USER-DRIVEN PRIORITY BASED JOB SCHEDULING IN A DATA PROCESSING PLATFORM

The present disclosure relates generally to job scheduling in a shared data processing platform and, more particularly, to a method and apparatus for a user-driven priority based job scheduling in a data processing platform.

BACKGROUND

As big data analytics is becoming more and more critical in the business domain, demands for big data processing platforms as a service and a multi-tenancy of the big data processing platforms are increasing. The big data processing platforms allow users to rent a large scale cluster whenever they need and pay for the service without building an expensive cluster.

In a shared cluster, many users are likely to submit jobs simultaneously and compete for resources to execute their jobs. The various jobs submitted by the users may have different time requirements and resource requirements. Thus, current job scheduling schemes are ineffective and limited in handling the different variables associated with job request from different users when submitted simultaneously or in a short time and some or the entire part of their runs are overlapped with others in a big data processing platform.

SUMMARY

According to aspects illustrated herein, there are provided a method, a non-transitory computer readable medium, and an apparatus for scheduling a job request in a data processing platform. One disclosed feature of the embodiments is a method that receives a new job request having a priority selected by a user, submits the new job request to an online job queue comprising a plurality of jobs, wherein each one of the plurality of jobs comprises a respective priority selected by a respective user and schedules the new job request and the plurality of jobs in the online job queue to one or more available worker nodes in a unit time slot based upon a comparison of the priority of the new job and the respective priority of the plurality of jobs in the online job queue, wherein the scheduling algorithm is based on at least one of: blocks having a variable size and a static processing time or blocks having a static size and a variable processing time.

Another disclosed feature of the embodiments is a non-transitory computer-readable medium having stored thereon a plurality of instructions, the plurality of instructions including instructions, which when executed by a processor, cause the processor to perform an operation that receives a new job request having a priority selected by a user, submits the new job request to an online job queue comprising a plurality of jobs, wherein each one of the plurality of jobs comprises a respective priority selected by a respective user and schedules the new job request and the plurality of jobs in the online job queue to one or more available worker nodes in a unit time slot based upon a comparison of the priority of the new job and the respective priority of the plurality of jobs in the online job queue, wherein the scheduling algorithm is based on at least one of: blocks having a variable size and a static processing time or blocks having a static size and a variable processing time.

Another disclosed feature of the embodiments is an apparatus comprising a processor and a computer readable medium storing a plurality of instructions, which when executed by the processor, cause the processor to perform an operation that receives a new job request having a priority selected by a user, submits the new job request to an online job queue comprising a plurality of jobs, wherein each one of the plurality of jobs comprises a respective priority selected by a respective user and schedules the new job request and the plurality of jobs in the online job queue to one or more available worker nodes in a unit time slot based upon a comparison of the priority of the new job and the respective priority of the plurality of jobs in the online job queue, wherein the scheduling algorithm is based on at least one of: blocks having a variable size and a static processing time or blocks having a static size and a variable processing time.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for scheduling a job request in a data processing platform. As discussed above, big data analytics is becoming more and more critical in the business domain, demands for big data processing platforms as a service and a multi-tenancy of the big data processing platforms are increasing. The big data processing platforms allow users to rent a large scale cluster whenever they need and pay for the service without building an expensive cluster.

In a shared cluster, many users are likely to submit jobs simultaneously and compete for resources to execute their jobs. The various jobs submitted by the users may have different time requirements and resource requirements. Thus, current job scheduling schemes are ineffective and limited in handling the different variables associated with job request from different users when submitted simultaneously or in a short time and some or the entire part of their runs are overlapped with others in a big data processing platform.

One embodiment of the present disclosure provides an online job queue and a reservation queue simultaneously for allowing users to either pay a set fee for the reservation queue or compete for resources using a dynamic pricing model of the online job queue. For example, big data processing platforms, such as Hadoop®, require a first in first out model for job requests. However, some users may want to pre-empt other users who are waiting by paying a higher price for resources. In one embodiment of the present disclosure, the pricing for resources for jobs in the online job queue may be driven by a user selected priority.

Hadoop® uses a block-based allocation scheme. In contrast, the embodiments of the present disclosure use a time-based allocation scheme. Other prioritizing schemes have been developed based on bidding for resources. However, these methods allocate all of the resources in advance and are inflexible to changes that occur in process (e.g., a bid cannot change after a job starts) or new jobs that are submitted with higher bids as each unit time slot passes.

Figure 1:
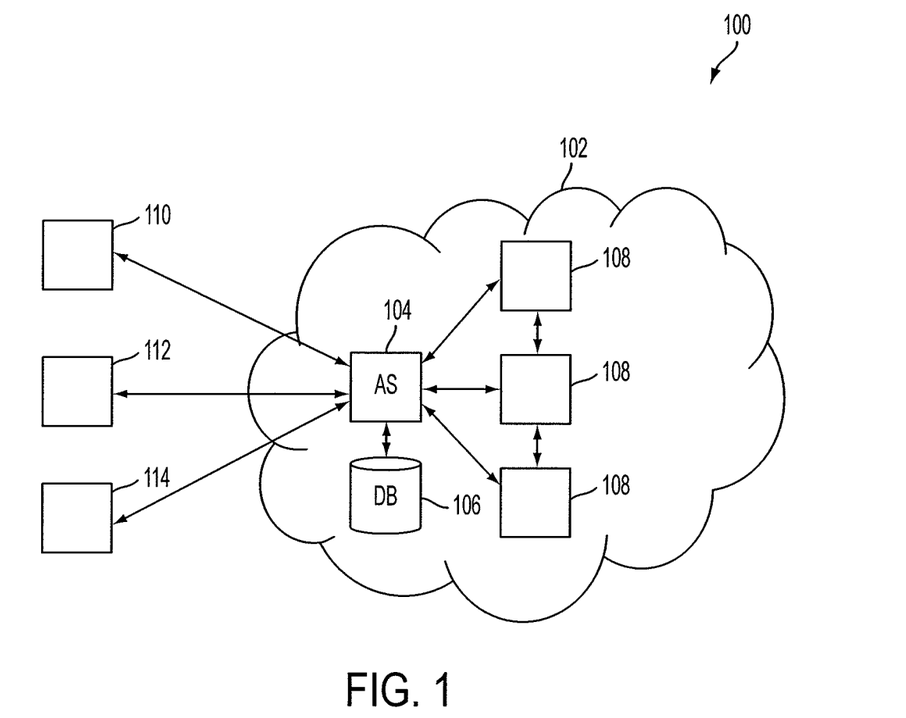
FIG. 1 illustrates example communication network.

FIG. 1 illustrates a communications network 100. In one embodiment, the communications network 100 may be any type of network such as a wireless-fidelity (Wi-Fi) network, an access network, a wide area network (e.g., an enterprise having multiple different locations across the country), a local area network within a single enterprise location, a cellular network, and the like.

In one embodiment, the communications network 100 may include additional access networks that are not disclosed. For example, the communications network 100 may include one or more access networks such as a cellular network, a Wi-Fi network, and the like. In one embodiment, the communications network 100 may also include additional network elements not shown to simplify the network illustrated in FIG. 1, such as for example, gateways, routers, switches, various application servers, and the like.

In one embodiment, the communications network 100 may include a data processing platform 102. In one embodiment, the data processing platform 102 may be a large distributed data processing platform that comprises a cluster of computers. In one embodiment, a plurality of users may submit job requests to the data processing platform 102 and only pay for the processing resources that are used to leverage the computing resources of the data processing platform 102, thereby, saving costs associated with the high capital investment to deploy an equivalent processing infrastructure. In one embodiment, the data processing platform 102 may be Hadoop®.

In one embodiment, the data processing platform 102 may include an application server (AS) 104 and a database (DB) 106. In one embodiment, the AS 104 may be in communication with one or more network elements cluster of computers 108 each having a plurality of worker nodes that provide processing resources. One example, of a big distributed data processing platform that can be used in the present disclosure is Hadoop®. Although only three clusters of computers 108 are illustrated in FIG. 1, it should be noted that any number of computer clusters and worker nodes may be deployed (e.g., more or less).

In one embodiment, the DB 106 may store various algorithms used to perform the scheduling of the online job queue, store the jobs in the online job queue, store jobs waiting to be processed in a reservation queue, and the like. In one embodiment, the AS 104 may be in communication with the DB 106 and access information stored in the DB 106 to perform various calculations and analysis of data. For example, the AS 104 may perform the calculations to determine how worker nodes should be assigned for scheduling of the jobs in the online job queue, calculate an expected completion time and an expected cost for new job requests based upon a user selected priority, and the like.

In one embodiment, one or more endpoint devices 110, 112 and 114 may be communication with the AS 104 to submit new job requests for the data processing platform 102. Although three endpoint devices 110, 112 and 114 are illustrated in FIG. 1 any number of endpoint devices may be deployed (e.g., more or less).

In one embodiment, the endpoint devices 110, 112 and 114 may be in communication with the AS 104 via either a wired or wireless connection. In one embodiment, the endpoint devices 110, 112 and 114 may be any type of endpoint device capable of communicating with the AS 104 and submitting a job request to the data processing platform 102, such as for example, a desktop computer, a laptop computer, a smartphone, a cellular telephone, a tablet computer, a netbook computer, and the like In one embodiment, the AS 104 may provide the endpoint devices 110, 112 and 114 a user interface (e.g., a website) to submit new job requests, provide priority information for the new job request, display a current range of priorities for pending job requests in the online job queue, displaying expected completion times and expected costs that are estimated, a scheduling calendar for making a reservation in a reservation queue, and the like.

Figure 2:
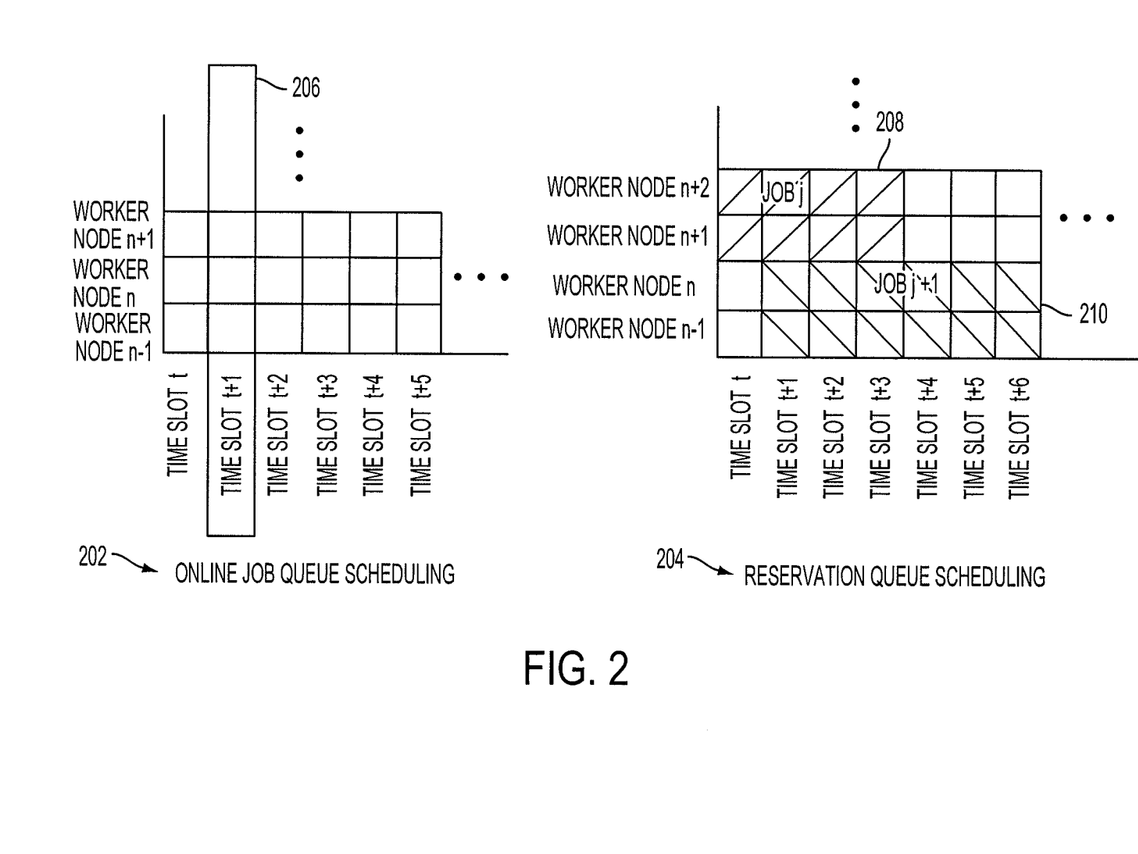
FIG. 2 illustrates a visual representation of online scheduling and reservation scheduling.

In one embodiment, the data processing platform 102 may provide an option to a user to submit new job requests to an online job queue or a reservation queue. FIG. 2 illustrates a visual representation of the online job queue scheduling 202 and a visual representation of the reservation queue scheduling 204 to illustrate the difference between the two queues. In one embodiment, the online job queue scheduling 202 may comprise a plurality of blocks. The online job queue scheduling 202 assigns each worker node, n−1, n and n+1 individually for each unit time slot 206.

In one embodiment, the reservation queue scheduling 204 may comprise a plurality of blocks and provides the user one or more available worker nodes n−1, n, n+1 and n+2 over a future time period t to t+6. The users may then reserve one or more worker nodes for new job requests that can be processed at a future time. For example, the reservation queue scheduling 204 illustrates a job "j" that reserves the blocks included with worker nodes n+1 and n+2 during time slots t to t+3 and a job "j+1" that reserves blocks included with worker nodes n−1 and n during time slots t+1 to t+6. It should be noted that the number of blocks, worker nodes and unit time slots illustrated in FIG. 2 are only illustrative and that any number of blocks, worker nodes or unit time slots may be used.

In one embodiment, the reservation queue may be cheaper or lower in costs to reserve worker nodes than the online job queue. In one embodiment, the reservation queue may be a cost effective option for those users who have job requests that are not time sensitive. In one embodiment, reserving one or more worker nodes in the reservation queue may be relatively simple. For example, the AS 104 may provide the user endpoint 110 a calendar of available worker nodes for a period of time. The user may then select reserve one or more of the available worker nodes for any available unit time slots.

In one embodiment, a predefined number of all worker nodes may be reserved for the reservation queue. For example, the data processing platform 102 may reserve 20% of the worker nodes to be used only for the reservation queue. As a result, when the online job queue is scheduling the remaining worker nodes no conflict would arise between the worker nodes reserved for the reservation queue and the worker nodes reserved for the online job queue.

In one embodiment, the online job queue may be more expensive or cost more to use than the reservation queue. The online job queue may be used in a competitive pricing environment where blocks of each worker node are competitively priced for every unit time slot. For example, where a user's job request is time sensitive and the user may be willing to bid higher amount (e.g., via selecting a higher priority than other priorities currently submitted) to ensure the user's job request is completed within the sensitive time requirements the user may choose to use the online job queue.

In one embodiment, the online job queue may be scheduled using an algorithm based on the blocks of the job requests having a variable size and a static processing time or using an algorithm based on blocks of the job requests having a static size and a variable processing time. In one embodiment, both algorithms for the online job queue scheduling perform a dynamic scheduling algorithm that is iterative for each unit time slot. In other words, all of the worker nodes are not allocated in advance for each job request. Rather, the algorithms schedule jobs in the online job queue based on priority and allocate worker nodes accordingly during each unit time slot.

Said another way, a job at a unit time slot t=0 may initially start with x number of worker nodes allocated to it, but then at unit time slot t=1, the algorithms would again schedule the jobs in the online job queue and the job may only be allocated x−1 worker nodes during the unit time slot t=1. In one embodiment, the service provider of the data processing platform 102 may select one of the scheduling algorithms in advance and use the same algorithm for online job queue scheduling.

In one embodiment, the algorithm based on the blocks having the variable size and the static processing time may comprise a function of a capacity of a job represented as a ratio of the job over a sum of all priorities, a function of a total number of worker nodes represented as a minimum of the capacity, a remaining number of required unit time slots for the job and a remaining number of worker nodes available in a current unit time slot and a function of a forfeit represented as a difference of the total number of work nodes and the capacity. Mathematically, the function of the capacity, the function of the total number of worker nodes and the function of the forfeit may be represented by Equations (1)-(3) below:

$$C_i = \left(N \times \frac{P_i}{\sum_i P_i} - F_i\right), \quad \text{Equation (1)}$$

where $C_i$ represents the capacity of each job i, N represents the total number of worker nodes, $P_i$ represents a priority of a job i, $\sum_i P_i$ represents a sum of all priorities of i jobs and $F_i$ represents a forfeit from a previous unit time slot.

$$N_i = \min(\lceil C_i \rceil, R_i, R_N), \quad \text{Equation (2)}$$

where $N_i$ represents the actual number of worker nodes allocated for job i as a function of a minimum among a nearest integer $\lceil C_i \rceil$, a remaining number of required time slots $R_i$ for job i and a number of available worker nodes in the time slot $R_N$.

$$F_i = N_i - C_i \quad \text{Equation (3)}$$

To illustrate how Equations (1)-(3) are applied for scheduling an online job queue where based on the blocks having the variable size and the static processing time assume a number of worker nodes N=4, three jobs i=1, i=2 and i=3 are submitted sequentially in time at time t=0, t=1 and t=2, with a priority $P_1=3$, $P_2=1$, $P_3=4$, respectively, and the required unit time slots to complete the jobs are 10, 8 and 12, respectively. In the present example, the higher priority job is scheduled first and the higher value is considered to have a higher priority.

At t=0, only one job i=1 is waiting in the online job queue. Using Equations (1)-(3) above:

$$C_1 = \left(4 \times \frac{3}{3} - 0\right) = 4$$

$$N_1 = \min(4, 10, 4) = 4$$

$$F_1 = 4 - 4 = 0$$

$$R_1 = 10 - N_1 = 6$$

$$R_N = 4 - N_1 = 0$$

At t=1, two jobs i=1 and i=2 are waiting in the online job queue. Using Equations (1)-(3) above for jobs i=1 and i=2:

For job i=1 ($P_1=3$)

$$C_1 = \left(4 \times \frac{3}{4} - 0\right) = 3$$

$$N_1 = \min(3, 6, 4) = 3$$

$$F_1 = 3 - 3 = 0$$

$$R_1 = 6 - N_1 = 3$$

$$R_N = 4 - N_1 = 1$$

For job i=2 ($P_2=1$)

$$C_2 = \left(4 \times \frac{1}{4} - 0\right) = 1$$

$$N_2 = \min(1, 8, 1) = 1$$

$$F_2 = 1 - 1 = 0$$

$$R_2 = 8 - N_2 = 7$$

$$R_N = 1 - N_2 = 0$$

At t=2, three jobs i=1, i=2 and i=3 are waiting in the online job queue. Using Equations (1)-(3) above for jobs i=1, i=2 and i=3:

For job i=3 ($P_1=4$)

$$C_3 = \left(4 \times \frac{4}{8} - 0\right) = 2$$

$$N_3 = \min(2, 12, 4) = 2$$

$$F_3 = 2 - 2 = 0$$

$$R_3 = 12 - N_3 = 10$$

$$R_N = 4 - N_3 = 2$$

For job i=1 ($P_1=3$)

$$C_1 = \left(4 \times \frac{3}{8} - 0\right) = 1.5$$

$$N_1 = \min(2, 3, 2) = 2$$

$$F_1 = 2 - 1.5 = 0.5$$

$$R_1 = 3 - N_1 = 1$$

$$R_N = 2 - N_1 = 1$$

For job i=2 ($P_2$=1)

$$C_2 = \left(4 \times \frac{1}{8} - 0\right) = 0.5$$

$$N_2 = \min(1, 7, 0) = 1$$

$$F_2 = 0 - 0.5 = -0.5$$

$$R_2 = 7 - N_2 = 7$$

$$R_N = 0 - N_2 = 0$$

At t=3, three jobs i=1, i=2 and i=3 are waiting in the online job queue. Using Equations (1)-(3) above for jobs i=1, i=2 and i=3:

For job i=3 ($P_1$=4)

$$C_3 = \left(4 \times \frac{4}{8} - 0\right) = 2$$

$$N_3 = \min(2, 10, 4) = 2$$

$$F_3 = 2 - 2 = 0$$

$$R_3 = 10 - N_3 = 8$$

$$R_N = 4 - N_3 = 2$$

For job i=1 ($P_1$=3)

$$C_1 = \left(4 \times \frac{3}{8} - 0.5\right) = 1$$

$$N_1 = \min(1, 1, 2) = 1$$

$$F_1 = 1 - 1 = 0$$

$$R_1 = 1 - N_1 = 0$$

$$R_N = 2 - N_1 = 1$$

For job i=2 ($P_2$=1)

$$C_2 = \left(4 \times \frac{1}{8} + 0.5\right) = 1$$

$$N_2 = \min(1, 7, 1) = 1$$

$$F_2 = 1 - 1 = 0$$

$$R_2 = 7 - N_2 = 6$$

$$R_N = 1 - N_2 = 0$$

Figure 3:
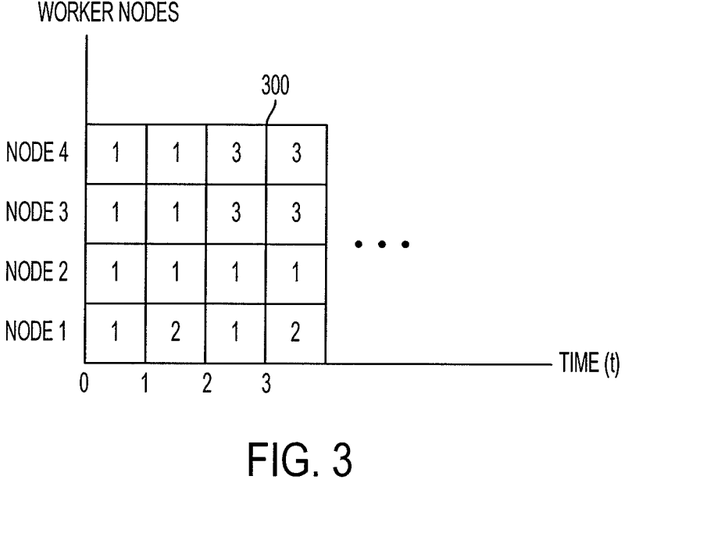
FIG. 3 illustrates a visual representation of a snapshot of online scheduling for blocks having a variable size and a static processing time.

FIG. 3 illustrates a snapshot 300 of the schedule for the above example for nodes 1-4 over unit time slots 0-4. Based upon the priority, at time 0 since the only job in the online job queue is job i=1 all four nodes are assigned to job i=1. At time t=0, based upon the calculation that takes into account the priority the first three nodes 2-4 are assigned to job i=1 and the last node 1 is assigned to job i=2. At time t=2, based upon the calculation that takes into account the priority, the first two nodes 3 and 4 are assigned to job i=3 and the last two nodes 1 and 2 are assigned to job i=1. Notably, the job i=2 is not assigned a node at time t=2 due to no available nodes remaining and having the lowest priority. At time t=3, based upon the calculation that takes into account the priority, the first two nodes 3 and 4 are again assigned to job i=3. However, job i=1 only needs one additional block to complete processing of the job so only node 2 is assigned to job i=1. Job i=2 is assigned the last node 1.

An example Algorithm that may be implemented is illustrated below as Algorithm 1.

---
ALGORITHM 1
---

Input
    N: the number of worker nodes
    J: a set of jobs waiting in the queue
    $P_J$: the priority for J
    $R_J$: the remaining number of required unit time slots for J
                //initialized as the number of required unit time
                //slots to complete when each job is submitted
For each time slot t
    Add new jobs into J;
    Add the priority of new jobs to $P_J$;
    Add the number of remaining unit time slots for new jobs to $R_J$;
    $R_N$ = N;    //initialize the number of available
                //worker nodes as the number of total worker nodes
    Sort jobs J in decreasing order of priority, S;
    For each sorted job i ∈ S
        Calculate $C_i$, $N_i$, and $F_i$;    //from Equation (1), (2), and (3)
        $R_i = R_i - N_i$;    //update the remaining number
                //of required unit time slots
        $R_N = R_N - N_i$;    //update the remaining number
                //of worker nodes
    End for
    Schedule $N_i$ where i ∈ S for time slot t;
End for.

---

In one embodiment, the algorithm based on the blocks having a static size and a variable processing time may comprise a function of a capacity of a job represented as a ratio of the job over a sum of all priorities, a function of a total number of worker nodes represented as a minimum of the capacity, a remaining number of required unit time slots for the job and a remaining number of worker nodes available in a current unit time slot, a function of a forfeit represented as a difference of the total number of work nodes and the capacity, an actual allocation of the one or more available worker nodes in one or more future unit time slots and an additional forfeit for using consecutive unit time slots.

Some online scheduling may support when blocks have variable processing time and a static size because some data processing platforms (e.g., Hadoop®) may like to use the same size block for different applications. In one embodiment, unit time slots may be allocated for processing a block consecutively. For example, let us assume that a block for application A and a block for application B are the same size but require 2 unit time slots for application A and 3 unit time slots for application B to be completed. Then each block is allocated across unit time slots consecutively as many as it requires (e.g., 2 consecutive unit time slots for A on a worker node and 3 consecutive unit time slots for B on a worker node).

Mathematically, the function of the capacity, the function of the total number of worker nodes and the function of the forfeit may be represented by Equations (1)-(3) described above. In addition, the actual allocation of the one or more available worker nodes is represented by $N_i(t)$, for job i at time t. The additional forfeit may be represented using Equation (4) described below:

$$\text{if}(N_i < N_i(t)), \text{ then } F_i = F_i + (N_i(t) - N_i) \qquad \text{Equation (4)}$$

In addition, Equation (5) may be used as described below:

$$\text{if } ((N_i - N_i(t)) > N_{available}(t)), \text{ then } F_i = F_i - (N_i - N_i(t) - N_{available}(t)), \qquad \text{Equation (5)}$$

where $N_{available}(t)$ represents the number of available worker nodes.

The Equation (5) may mean that if a job i can allocate more worker nodes based on its priority but there is no available worker node due to consecutive allocation from a previous schedule, then the difference is subtracted from the forfeit so that it would have more capacity for future allocation.

To illustrate how Equations (1)-(5) are applied for scheduling an online job queue where based on the blocks having a static size and a variable processing time assume a number of worker nodes N=4 and three jobs. Two of the jobs i=1 and i=2 are submitted at time t=0, with a priority $P_1=3$ and $P_2=1$, respectively. The number of consecutive unit time slots for processing a block is 2 for job i=1 and 3 for job i=2. Then another job i=3 is submitted at time t=1 with priority $P_3=2$ and the number of unit time slots for processing a block is 1. The number of blocks for each one of the jobs is 5. In the present example, the higher priority job is scheduled first and the higher value is considered to have a higher priority.

At time t=0, there are two jobs submitted:
For job i=1 ($P_1=3$),
  $C_1=3$, $N_1=3$, $F_1=0$ from Equations (1)-(3) above,
  $N_1(1)=3$
  no additional forfeit from equation (4) or (5),
For job i=2 ($P_2=1$)
  $C_2=1$, $N_2=1$, $F_2=0$ from Equations (1)-(3) above,
  $N_2(1)=1$, $N_2(2)=1$
  no additional forfeit from equation (4) or (5).
At time t=1, since a new job is submitted, three jobs are scheduled in the order of priority.
For job i=1 ($P_1=3$),
  $C_1=2$, $N_1=2$, $F_1=0$ from Equations (1)-(3) above, additional forfeit $F_1=0+(3-2)=1$ from Equations (4) above,
For job i=3 ($P_3=2$)
  $C_3=1.3$, $N_3=1$, $F_3=-0.3$ from Equations (1)-(3) above, additional forfeit $F_3=-0.3-(1-0-0)=-1.3$ from Equations (5) above,
For job i=2 ($P_2=1$)
  $C_2=0.7$, $N_2=1$, $F_2=0.3$ from Equations (1)-(3) above, additional forfeit $F_2$ has no change by equation (4) or (5).
At time t=2,
For job i=1 ($P_1=3$),
  $C_1=2-1=1$, $N_1=1$, $F_1=0$ from Equations (1)-(3) above, additional forfeit $F_1$ has no change by Equations (4) or (5),
For job i=3 ($P_3=2$)
  $C_3=1.3+1.3=2.6$, $N_3=3$, $F_3=0.4$ from Equations (1)-(3) above, additional forfeit $F_3=0.4-(1-0-0)=-0.6$ from Equations (5) above,
For job i=2 ($P_2=1$)
  $C_2=0.7-0.3=0.4$, $N_2=0$, $F_2=-0.4$ from Equations (1)-(3) above, additional forfeit $F_2=-0.4+(1-0)=0.6$ from Equations (4) above.

Figure 4:
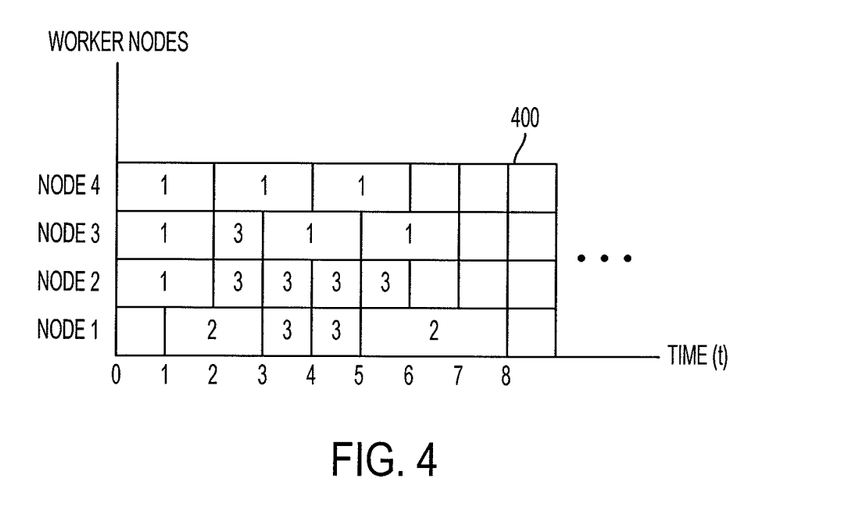
FIG. 4 illustrates a visual representation of a snapshot of online scheduling for blocks having a static size and a variable processing time.

FIG. 4 illustrates a snapshot 400 of the schedule for the above example for nodes 1-4 over unit time slots 0-8 for up to time t=5. For example, if the above example was carried out to time t=5, the scheduling of jobs i=1, i=2 and i=3 would be scheduled as illustrated in FIG. 4. An example Algorithm that may be implemented is illustrated below in Algorithm 2.

---

ALGORITHM 2

Input
  N: the number of worker nodes
  J: a set of jobs waiting in the queue
  $P_J$: the priority for J

---

-continued

ALGORITHM 2

$R_J$: the remaining number of required unit time slots for J
    //initialized as the number of required unit time slots
    //to complete when each job is submitted
Declare $N_i(T)$ as a circular array and initialize it to 0;
For each time slot t
  Add new jobs into J;
  Add the priority of new jobs to $P_J$;
  Add the number of remaining unit time slots for new jobs to $R_J$;
  Add the number of consecutive unit time slots for processing a block $B_J$;
  $R_N = N$;      //initialize the number of available
                  //worker nodes as the number of total worker nodes
  Sort jobs J in decreasing order of priority, S;
  For each sorted job i ∈ S
    Calculate $C_i$, $N_i$, and $F_i$;   // from Equation (1), (2), and (3)
    $R_i = R_i - N_i$;          // update the remaining number
                                 //of required unit time slots
    $R_N = R_N - N_i$;          // update the remaining number
                                 //of worker nodes
    If ($N_i < N_i(t)$) Then    // if more worker nodes are
                                 //allocated than its capacity, Eq. (4)
      $F_i = F_i + (N_i(t) - N_i)$;
                                 // then add forfeit
    Else If (($N_i - N_i(t)) > N_{available}(t)$) Then
                                 // if no available worker nodes, Eq. (5)
      $F_i = F_i - (N_i - N_i(t) - N_{available}(t))$;
                                 // then reduce forfeit
    End If
    If ($N_i > N_i(t)$) Then    // new block allocation
      For x = 1 to min($N_i - N_i(t), N_{available}(t)$)
        For y = t to t+$B_i$ - 1
          $N_i(y) = N_i$;
                                 // set allocation for consecutive time slots
        End For
        Schedule $N_i$ where i ∈ S from time slot t to t+$B_i$ - 1;
      End For
    End If
  End For
End For.

---

Thus, one embodiment of the present disclosure provides a method for providing dynamic online job scheduling that has dynamic pricing based upon a user selected priority for the job request and simultaneously provides a reservation queue scheduling method. In other words, unlike previous methods that allocate all of the user's resources in advance, the present disclosure dynamically allocates worker nodes during each unit time slot based upon the priority of jobs in the online job queue. In other words, the same worker nodes may not necessarily be assigned to the same jobs in successive unit time slots. In one embodiment, a user may even change a priority for a job request as the job request is being processed by the data processing platform by one or more assigned worker nodes. Thus, the present disclosure provides a more flexible scheduling approach to large data processing platforms, such as for example, Hadoop®.

Figure 5:
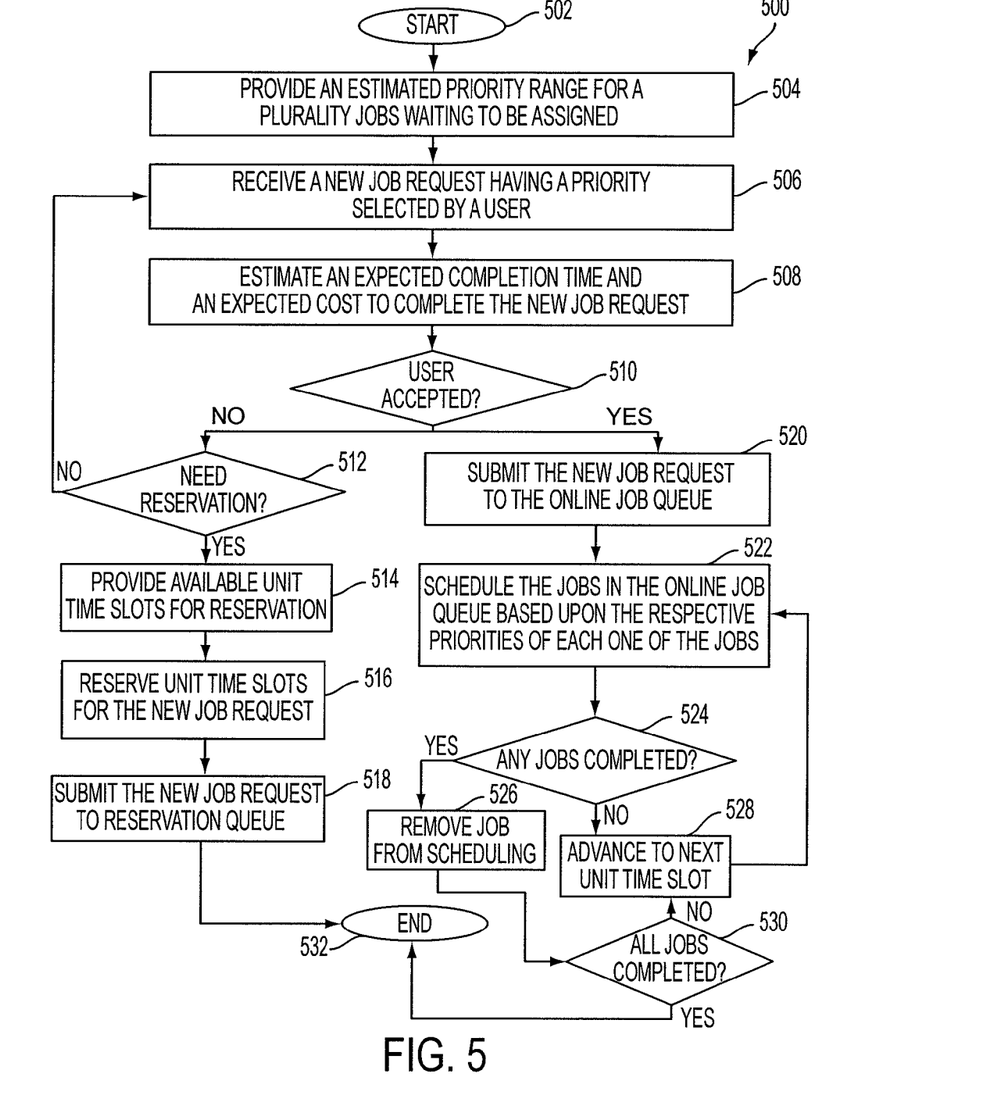
FIG. 5 illustrates an example flow chart of a method for scheduling a job request in a data processing platform.

FIG. 5 illustrates a flowchart of a method 500 for scheduling a job request in a data processing platform. In one embodiment, one or more steps or operations of the method 500 may be performed by the AS 104 or a general purpose computer 600 illustrated in FIG. 6.

The method 500 begins at step 502. At step 504, the method 500 provides an estimated priority range for a plurality of jobs waiting to be assigned. The user may use the estimated priority range to decide on an initial priority level for the new job request the user wants to submit. For example, based on the estimated priority range, the user may decide whether they are willing to pay a higher cost to select a priority that is on a higher end of the priority range, pay less for a priority that is on a lower end of the priority range or choose to use the reservation queue, as discussed below.

At step 506, the method 500 receives a new job request having a priority selected by a user. For example, after reviewing the estimated priority range for the plurality of jobs waiting to be assigned worker nodes in the online job queue, the user may select a priority for the new job request he or she is submitting.

At step 508, the method 500 estimates an expected completion time and an expected cost to complete the new job. In one embodiment, the expected completion time is based upon an execution time of a single block of the new job request, a size of the unit time slot and a number of blocks in the new job request. For example, for a unit time slot of $T_{unit}$ and an estimated execution time block of $T_{blk}$ the number of unit time slots for a block may be $[T_{blk}/T_{unit}]$ for job i. If it is assumed that blocks within a job have approximately the same execution time the number of required time slots for the job $J_i$ may be $J_i = B_i \times [T_{blk}/T_{unit}]$, where $B_i$ is the number of blocks for the job $J_i$ loaded into the file system of the data processing platform (e.g., Hadoop® File System (HDFS)).

In one embodiment, the expected cost may be a function of the priority selected by the user and the current priority range of the plurality of jobs waiting to be assigned. For example, the priority may be directly proportional to the estimated cost. In other words, the higher the priority relative to the current priority range, the higher the cost may be.

Said another way, the estimated cost may be dynamic. For example, the same priority may have a different cost depending on the current priority range. To illustrate at day 1, time x, a user may select a priority of 8 and the current range of priorities is relatively low at 1-5. At day 2, time y, a user may select a priority 8 and the current range of priorities may be relatively high at 4-8. The new job request on day 2, time y would be higher than the cost to complete the job at day 1, time x due to competitive pricing with other users that are selecting a similarly high priority for their respective jobs.

In another embodiment, the cost may be set for each different priority level. In other words, the cost may change depending on the selected priority for the new job request, but the cost for each priority level may remain constant.

At step 510, the method 500 determines if the expected completion time and the expected cost to complete the new job request is acceptable for using the online job queue. In other words, the method 500 may provide the user an option to make a reservation in a reservation queue for the new job request to be processed at a future time instead of submitting the new job request to the online job queue.

For example, the user may have a certain budget to complete a job and decide not to pursue the online job queue based upon the currently selected priority based upon the expected completion time and the expected cost. If the user does not accept the method 500 may proceed to step 512.

At step 512, the method 500 determines whether the user needs a reservation in the reservation queue. If the user does not want a reservation, the method 500 may return to step 506. The user may then input a new priority (e.g., lowering the priority to reduce costs) to try and obtain an expected completion time and expected cost that is acceptable. For example, the user may repeat steps 506, 508, 510 and 512 using different priorities by trial and error until an expected completion time and expected cost is acceptable.

If the user does want a reservation at step 512, the method 500 may proceed to step 514. At step 514, the method 500 may provide the user the unit time slots that are available for reservations. In one embodiment, the available unit time slots may be illustrated in a graphical form similar to the table 204 illustrated in FIG. 2.

At step 516, the method 500 reserves a unit time slot for the new job request based upon a user selection. For example, the user may select one or more desired unit time slots that are available and not already reserved for other jobs to complete the new job request of the user.

At step 518, the method 500 may submit the new job request to the reservation queue. The method 500 may then complete the new job request at some time in the future based upon the reserved one or more unit time slots. The method may then proceed to step 532, where the method 500 ends.

Referring back to step 510, if the user accepts, the method 500 proceeds to step 520. At step 520, the method 500 submits the new job request to the online job queue.

At step 522, the method 500 schedules the jobs in the online job queue (e.g., including the new job request that was added) based upon the respective priorities of each one of the jobs. The respective priorities are selected by a respective user of each one of the jobs.

In one embodiment, the scheduling of the jobs in the online job queue may be performed using an algorithm based on blocks having a variable size and a static processing time or an algorithm based on blocks having a static size and a variable processing time. The algorithm that can be used may be determined in advance by the data processing platform service provider.

In one embodiment, the algorithm based on blocks having a variable size and a static processing time may include the Equations (1)-(3) as implemented by Algorithm 1 described above and discussed above with reference to FIG. 3. In one embodiment, the algorithm based on blocks having a static size and a variable processing time may include the Equations (1)-(5) as implemented by Algorithm 2 described above and discussed with reference to FIG. 4.

At step 524, the method 500 determines if there are any completed jobs after the scheduling and the worker nodes complete their assigned processing of blocks for a present unit time slot. At step 524, if one or more jobs are completed, the method 500 may proceed to step 526. At step 526, the method 526 may remove the completed jobs from the scheduling.

At step 530, the method 500 determines if all jobs are completed. For example, after removing the one or more completed jobs at step 526, the method 500 may determine if there are any remaining jobs in the online job queue that have not been completed. If the method 500 determines that all the jobs are completed, the method 500 may proceed to step 532, where the method 500 ends.

If the method 500 determines that all the jobs are not completed, the method may proceed to step 528. Referring back to step 524, the method 500 may proceed to step 528 also from step 524 if the method determines that there are no completed jobs after the worker nodes complete their assigned processing of blocks for a present unit time slot.

At step 528, the method 500 may advance to the next unit time slot. The method 500 may then proceed back to step 522 to repeat the scheduling for any remaining jobs left in the online job queue and any new job requests that have been added at the subsequent unit time slot. In other words, the method 500 may repeat the scheduling for each successive unit time slot of a plurality of unit time slots for each one of one or more available worker nodes until all jobs are completed in the online job queue.

In one embodiment, the user may change the priority of his or her respect job in the online job queue in the middle of processing. If the user changes a desired priority, the pricing may be adjusted accordingly and the new or updated priority may be taken into consideration when the method 500 returns to step 522 to repeat the scheduling for the remaining jobs left in the online job queue.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 5 that recite a determining operation, or involve a decision, do not necessarily require that both branches of the determining operation be practiced. In other words, one of the branches of the determining operation can be deemed as an optional step.

Figure 6:
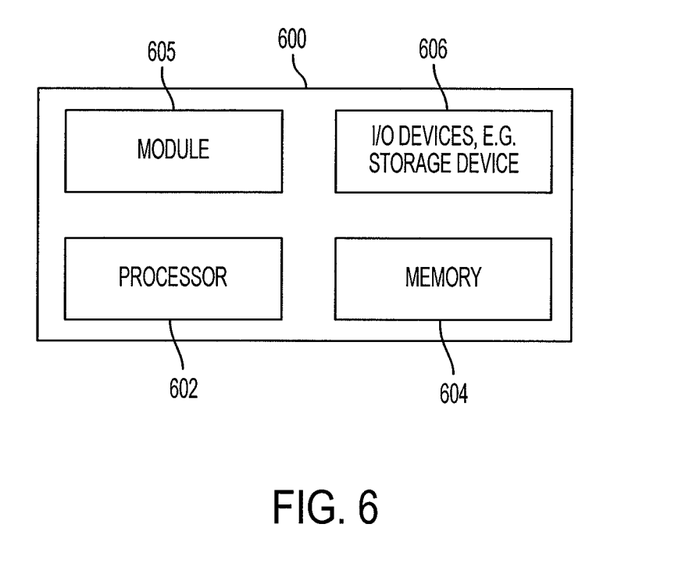
FIG. 6 illustrates a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for scheduling a job request in a data processing platform, and various input/output devices 606 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 605 for scheduling a job request in a data processing platform can be loaded into memory 604 and executed by processor 602 to implement the functions as discussed above. As such, the present method 605 for scheduling a job request in a data processing platform (including associated data structures) of the present disclosure can be stored on a non-transitory (e.g., physical and tangible) computer readable storage medium, e.g., RAM memory, magnetic or optical drive or diskette and the like. For example, the hardware processor 602 can be programmed or configured with instructions (e.g., computer readable instructions) to perform the steps, functions, or operations of method 500.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for scheduling a job request in a data processing platform, comprising:
  receiving, by a processor of the data processing platform, a new job request having a priority selected by a user;
  submitting, by the processor, the new job request to an online job queue comprising a plurality of jobs, wherein each one of the plurality of jobs comprises a respective priority selected by a respective user; and
  scheduling, by the processor, the new job request and the plurality of jobs in the online job queue to one or more available worker nodes in a unit time slot based upon a comparison of the priority of the new job and the respective priority of the plurality of jobs in the online job queue, wherein an algorithm for the scheduling is based on blocks having a variable size and a static processing time, wherein the algorithm based on the blocks having the variable size and the static processing time comprises a function of a capacity of a job represented as a ratio of the job over a sum of all priorities, a function of a total number of worker nodes represented as a minimum of the capacity, a remaining number of required unit time slots for the job and a remaining number of worker nodes available in a current unit time slot and a function of a forfeit represented as a difference of the total number of work nodes and the capacity.

2. The method of claim 1, wherein the data processing platform comprises a distributed processing platform comprising a cluster of computers.

3. The method of claim 1, wherein a cost of the new job request is a function of the priority selected by the user.

4. The method of claim 1, further comprising:
  repeating, by the processor, the scheduling for each successive unit time slot of a plurality of unit time slots for each one of the one or more available worker nodes.

5. The method of claim 1, further comprising:
  providing, by the processor, an option to the user to make a reservation in a reservation queue for the new job request to be processed at a future time instead of submitting the new job request to the online job queue.

6. The method of claim 5, wherein a predefined number of all worker nodes is reserved for the reservation queue and a remainder of the all worker nodes is used for the online job queue.

7. The method of claim 5, further comprising:
  estimating, by the processor, an expected completion time and an expected cost for the new job request to allow the user to decide between the reservation queue or the online job queue.

8. The method of claim 7, wherein the estimating the expected completion time is based upon an execution time of a single block of the new job request, a size of the unit time slot and a number of blocks in the new job request.

9. A non-transitory computer-readable medium storing a plurality of instructions, which when executed by a processor, cause the processor to perform operations for scheduling a job request in a data processing platform, the operations comprising:
  receiving a new job request having a priority selected by a user;
  submitting the new job request to an online job queue comprising a plurality of jobs, wherein each one of the plurality of jobs comprises a respective priority selected by a respective user; and
  scheduling the new job request and the plurality of jobs in the online job queue to one or more available worker nodes in a unit time slot based upon a comparison of the priority of the new job and the respective priority of the plurality of jobs in the online job queue, wherein an algorithm for the scheduling is based on blocks having a variable size and a static processing time, wherein the algorithm based on the blocks having the variable size and the static processing time comprises a function of a capacity of a job represented as a ratio of the job over a sum of all priorities, a function of a total number of worker nodes represented as a minimum of the capacity, a remaining number of required unit time slots for the job and a remaining number of worker nodes available in a current unit time slot and a function of a forfeit represented as a difference of the total number of work nodes and the capacity.

10. The non-transitory computer-readable medium of claim 9, wherein a cost of the new job request is a function of the priority selected by the user.

11. The non-transitory computer-readable medium of claim 9, further comprising:
repeating the scheduling for each successive unit time slot of a plurality of unit time slots for each one of the one or more available worker nodes.

12. The non-transitory computer-readable medium of claim 9, further comprising:
providing an option to the user to make a reservation in a reservation queue for the new job request to be processed at a future time instead of submitting the new job request to the online job queue.

13. The non-transitory computer-readable medium of claim 12, wherein a predefined number of all worker nodes is reserved for the reservation queue and a remainder of the all worker nodes is used for the online job queue.

14. The non-transitory computer-readable medium of claim 12, further comprising:
estimating, by the processor, an expected completion time and an expected cost for the new job request to allow the user to decide between the reservation queue or the online job queue.

15. The non-transitory computer-readable medium of claim 14, wherein the estimating the expected completion time is based upon an execution time of a single block of the new job request, a size of the unit time slot and a number of blocks in the new job request.

16. A method for scheduling a job request in a data processing platform, comprising:
receiving, by a processor of the data processing platform, a new job request having a priority selected by a user;
submitting, by the processor, the new job request to an online job queue comprising a plurality of jobs, wherein each one of the plurality of jobs comprises a respective priority selected by a respective user; and
scheduling, by the processor, the new job request and the plurality of jobs in the online job queue to one or more available worker nodes in a unit time slot based upon a comparison of the priority of the new job and the respective priority of the plurality of jobs in the online job queue, wherein an algorithm for the scheduling is based on blocks having a static size and a variable processing time, wherein the algorithm based on the blocks having the static size and the variable processing time comprises a function of a capacity of a job represented as a ratio of the job over a sum of all priorities, a function of a total number of worker nodes represented as a minimum of the capacity, a remaining number of required unit time slots for the job and a remaining number of worker nodes available in a current unit time slot, a function of a forfeit represented as a difference of the total number of work nodes and the capacity, an actual allocation of the one or more available worker nodes in one or more future unit time slots and an additional forfeit for using consecutive unit time slots.

17. A non-transitory computer-readable medium storing a plurality of instructions, which when executed by a processor, cause the processor to perform operations for scheduling a job request in a data processing platform, the operations comprising:
receiving a new job request having a priority selected by a user;
submitting the new job request to an online job queue comprising a plurality of jobs, wherein each one of the plurality of jobs comprises a respective priority selected by a respective user; and
scheduling the new job request and the plurality of jobs in the online job queue to one or more available worker nodes in a unit time slot based upon a comparison of the priority of the new job and the respective priority of the plurality of jobs in the online job queue, wherein an algorithm for the scheduling is based on blocks having a static size and a variable processing time, wherein the algorithm based on the blocks having the static size and the variable processing time comprises a function of a capacity of a job represented as a ratio of the job over a sum of all priorities, a function of a total number of worker nodes represented as a minimum of the capacity, a remaining number of required unit time slots for the job and a remaining number of worker nodes available in a current unit time slot, a function of a forfeit represented as a difference of the total number of work nodes and the capacity, an actual allocation of the one or more available worker nodes in one or more future unit time slots and an additional forfeit for using consecutive unit time slots.

* * * * *